United States Patent
Berglin et al.

(10) Patent No.: US 7,185,583 B2
(45) Date of Patent: Mar. 6, 2007

(54) MACHINE FOR PRECISION LOW STRESS CORING AND SLICING OF APPLES AND OTHER SOFT-CORED OR PITTED FRUITS

(75) Inventors: John Scott Berglin, East Wenatchee, WA (US); Kevin Alan Cyrus, East Wenatchee, WA (US)

(73) Assignee: Apples-to-Go, Inc., East Wenatchee, WA (US)

( * ) Notice: Subject to any disclaimer, the term of this patent is extended or adjusted under 35 U.S.C. 154(b) by 0 days.

(21) Appl. No.: 10/878,960

(22) Filed: Jun. 28, 2004

(65) Prior Publication Data

US 2005/0031748 A1    Feb. 10, 2005

Related U.S. Application Data

(60) Provisional application No. 60/482,982, filed on Jun. 27, 2003, provisional application No. 60/574,348, filed on May 25, 2004.

(51) Int. Cl.
*A23N 4/14*    (2006.01)
(52) U.S. Cl. .................... 99/558; 99/549; 426/484
(58) Field of Classification Search ............. 426/484; 99/558, 549
See application file for complete search history.

(56) References Cited

U.S. PATENT DOCUMENTS

| | | | | |
|---|---|---|---|---|
| 1,399,950 A * | 12/1921 | Fish ........................ | 99/545 |
| 1,408,051 A * | 2/1922 | Whittam .................. | 30/302 |
| 1,765,310 A * | 6/1930 | Reynolds ................. | 99/563 |
| 1,818,848 A * | 8/1931 | Gutzke .................... | 30/124 |
| 2,056,183 A * | 10/1936 | Gardner ................... | 83/167 |
| 2,229,168 A * | 1/1941 | Carroll et al. ............ | 426/484 |
| 2,383,814 A * | 8/1945 | Richardson .............. | 99/545 |
| 2,509,781 A * | 5/1950 | Pease ....................... | 99/553 |
| 2,671,485 A * | 3/1954 | Smith, Jr. et al. ........ | 99/553 |
| 2,703,122 A * | 3/1955 | Pease et al. .............. | 99/553 |
| 2,750,976 A * | 6/1956 | Ganze ...................... | 99/553 |
| 2,788,037 A * | 4/1957 | Carter ...................... | 99/546 |
| 3,373,786 A * | 3/1968 | Anderson et al. ........ | 99/490 |
| 3,696,847 A * | 10/1972 | Erekson et al. .......... | 99/545 |
| 3,698,847 A | 10/1972 | Erekson et al. .......... | 99/545 |
| 3,831,510 A * | 8/1974 | Loveland ................. | 99/553 |
| 3,841,440 A * | 10/1974 | Weddendorf ............ | 186/44 |
| 3,869,974 A * | 3/1975 | Ellis ........................ | 99/547 |
| 4,007,676 A * | 2/1977 | Ellis ........................ | 99/545 |
| 5,296,252 A * | 3/1994 | Mendenhall ............. | 426/615 |
| 5,421,249 A * | 6/1995 | Repisky et al. .......... | 99/545 |
| 5,979,281 A * | 11/1999 | Caesar ..................... | 83/167 |

\* cited by examiner

*Primary Examiner*—Anthony Weier
(74) *Attorney, Agent, or Firm*—Black Lowe and Graham PLLC

(57) ABSTRACT

Fruit items are positioned between vertical pins located in the calyx and stem hole of said fruit item, thereby securing the fruit item by a compressive force through its core. A core tube surrounding the upper pin descends to meet the lower pin, thereby completely piercing the fruit item and isolating its core inside the tube. A cushioned ram pushes the edible portion of the fruit item down over the core tube, through a cassette of radial knives, creating a plurality of wedges that fall immediately into an enzyme bath. The bath seals freshness into the fruit item's cell structure by preventing contact with oxygen. The solid core is ejected and the edible outside portion of the fruit item is not touched or bruised by mechanical handling.

16 Claims, 4 Drawing Sheets

Sectional Views

MACHINE FOR PRECISION LOW STRESS CORING AND SLICING OF APPLES AND OTHER SOFT-CORED OR PITTED FRUITS

PRIORITY CLAIM

This application claims priority to U.S. Ser. No. 60/482,982 entitled PREMIUM APPLE SLICING SYSTEM filed Jun. 27, 2003 and U.S. Ser. No. 60/574,348 entitled A SYSTEM AND METHOD FOR APPLE SLICING AND A DOUBLE-SEALING TRAY filed May 25, 2004, both of which are hereby incorporated herein by reference in their entirety as if fully set forth herein.

FIELD OF THE INVENTION

An apple processing machine which cores and slices apples and other soft fruits that are intended for fresh-slice consumption.

BACKGROUND OF THE INVENTION

Throughout history and prior to the mid 1990's, it was universally recognized that fresh sliced apple wedges would begin to turn brown within a few minutes of slicing. Consequently, fresh apples have always been sold in whole form and sliced in the home or restaurant just before use. The exceptions are the processors who slice apples for pie filling, dehydrated and canned fruit. Apples sliced toward these purposes do not require the scrutiny that a consumer would give to fresh-slice consumption. Consequently, the prior art of apple coring and slicing has focused on speed rather than accuracy, permitting "allowable" levels of bruising, or otherwise damaging of the fruit. Near perfect slicing with little or no bruising was perceived as unnecessary.

Breakthroughs in enzyme research during the 1990's have produced a solution for keeping apple slices from turning brown. This has created consumer demand for sliced apples for fresh consumption and greater consumer scrutiny of the product. However, existing equipment can not meet the demand for this higher level of apple-slice quality. Current machinery uses mechanical grippers, pins, conveyers, agitators and other similar means to orient apples, hold them during slicing or peeling, transfer them from station to station, and cut away at their seed pods and skins.

Although prior inventions have attempted to accomplish "careful handling" of fruit in the slicing process, they all fall short of their objectives. Examples are as follows:

1) Some prior art devices attempt to orient the apple using locators in the blossom and stem holes, but thereafter transfer the apple through successive stations where that registration is lost. The stations where the "orientation" occurs are not the stations where the slicing and related processes occur; 2) Machines that mechanically remove the core from the middle of the apple fail to recognize that the core of the apple is not always in the geometric center of its equator, or in the center of gravity of the apple. The core is more typically in line between the stem hole and the calyx; but even then the axis formed by the stem hole and calyx is often enough not an axis through the center of gravity of the apple. As a result of these problems, the prior art machines do not consistently and accurately remove the entire core with a minimum of damage and lost fruit; 3) Prior devices "grab" or grasp the outside of the apple mechanically, which bruises the apple, causing discoloration, change of flavor and more rapid decay. Bruises from pressure will turn brown even with enzyme treatment; 4) Nibbling away at the core or trepanning or machining or spiral cutting the core of the apple causes abrasion which also causes browning in spite of enzyme treatment; and 5) Any tearing action (as opposed to cutting) breaks up the cell structure of the apple meat and causes browning and unsightly and unappetizing rough surfaces.

SUMMARY OF THE INVENTION

The preferred embodiment of the present invention relates to solving the foregoing and related problems. The preferred embodiment of the present invention relates to a solution to creating fresh apple slices with little or no deterioration and discoloration. The preferred embodiment of the present invention comprises features that previously have never been addressed: avoiding the need for mechanical "gripping" on the outside of the fruit; holding the apple by the core during coring and slicing; holding the travel path of the apple straight as the apple passes through the slicing blades; piercing the core and isolating it, not spiral cutting the core away as debris; and locating, coring and slicing all in one station and/or in one continuous movement.

OBJECTS AND FEATURES OF THE PREFERRED EMBODIMENT OF THE INVENTION

One principal objective of the preferred embodiment of this invention is to core and slice apple wedges for fresh-slice consumption, by minimizing mechanical stresses on the apple during processing and by effecting straight and precise cuts through the apple with little or no tearing of the apple's cell structure.

An object of the preferred embodiment of this invention is to hold the apple by the core, using a compressive force applied between twin-opposed coaxial pins that are positioned into the calyx and the stem hole, the force being sufficient to retain the core after the edible portion of the apple is removed.

Another objective of the preferred embodiment of this invention is to accurately locate the core and seedpod of the apple and to remove them in solid form without creating debris.

Another objective of the preferred embodiment of this invention is to hold the apple by the core, in order to eliminate machine contact with the outer skin of the edible part of the apple, thereby preventing grasping, pinching, impacting or similar pressures that would otherwise bruise the edible portion of the apple.

Another objective of the preferred embodiment of this invention is to provide for human discretion in the placement and orientation of the apple before coring and slicing.

Another objective of the preferred embodiment of this invention is to hold the apple by the aforementioned pins and to shape the contact surfaces to fit the apple's contour in those regions, thus maximizing their area of contact.

Another objective of the preferred embodiment of this invention is to hold the core of the apple between the aforementioned pins with a pressure that can be adjusted to accommodate the characteristics of different varieties of fruit, their hardness, pressure and other characteristics that affect the general strength of the fruit during processing.

Another objective of the preferred embodiment of this invention is to provide a straight and continuous guide path of apple movement by aligning the concentricity of guide pins, core tube and ram.

Another objective of the preferred embodiment of this invention is to provide a straight and continuous guide path for the apple's movement by requiring the outside diameters of the core tube and lower guide pin to be effectively the same diameter, same shape, same surface finish and joined "in line, end to end" during slicing.

Another objective of the preferred embodiment of this invention is to pierce the core of the apple with a thin-walled core tube, to minimize friction and displacement of the apple's cell structure during coring.

An object of the preferred embodiment of this invention is to create a solid core that is retained during the slicing motion and ejected separately thereafter.

Another object of the preferred embodiment of this invention is to directly slice wedges in a downward motion immediately into an enzyme emersion without delays that would permit oxygen degradation of the fresh-cut apple surfaces.

Another object of the preferred embodiment of this invention is to separate the sliced wedges during their descent through the slicing blades such that they fall into enzyme emersion as individual segments, thus assuring complete enzyme coating of the all sliced surfaces.

Another object of the preferred embodiment of this invention is to provide a modular design to the machine which allows for variable sizes of guide pins and core tubes, suitable for various sizes of apples, recognizing that larger apples have larger core and seedpod areas, requiring larger core tubes and guide pins.

OBJECTIVES WITH REGARD TO THE EQUIPMENT, ITS SAFETY, PRODUCTIVITY, USEFUL LIFE, AND EFFICIENT OPERATION

Another principal object of the preferred embodiment of this invention is to automate the apple coring and slicing operation for the sake of product quality, food safety and production efficiency.

An objective of the preferred embodiment of this invention is to balance the center of gravity and the center of all forces in the machinery, using a radial design such that all forces are at equilibrium in the geometric center of the machine.

An objective of the preferred embodiment of this invention is to use compatible materials which may be similar or dissimilar depending on their requirements for strength, wear, rigidity, natural lubricity, induced or reduced friction and non-corrosive applications, recognizing that the invention must meet the material requirements for food safety applications.

An objective of the preferred embodiment of this invention is an "open architectural design" that permits easy cleaning, easy disassembly and replacement of components and reassembly of the equipment.

An objective of the preferred embodiment of this invention is to perform in an automated continuous duty cycle for long periods of time.

An objective of the preferred embodiment of this invention is to provide infinite speed, pressure and time delay adjustability, any combination of which can be suited to the product and operator's requirements.

An objective of the preferred embodiment of this invention is to allow human discretion in the apple selection and placement process at the point of insertion of the apple.

The foregoing objects, and how they are accomplished by one or more features of the preferred embodiment of the invention are more fully described below.

DETAILED DESCRIPTION OF THE PREFERRED EMBODIMENT

Figure 1:
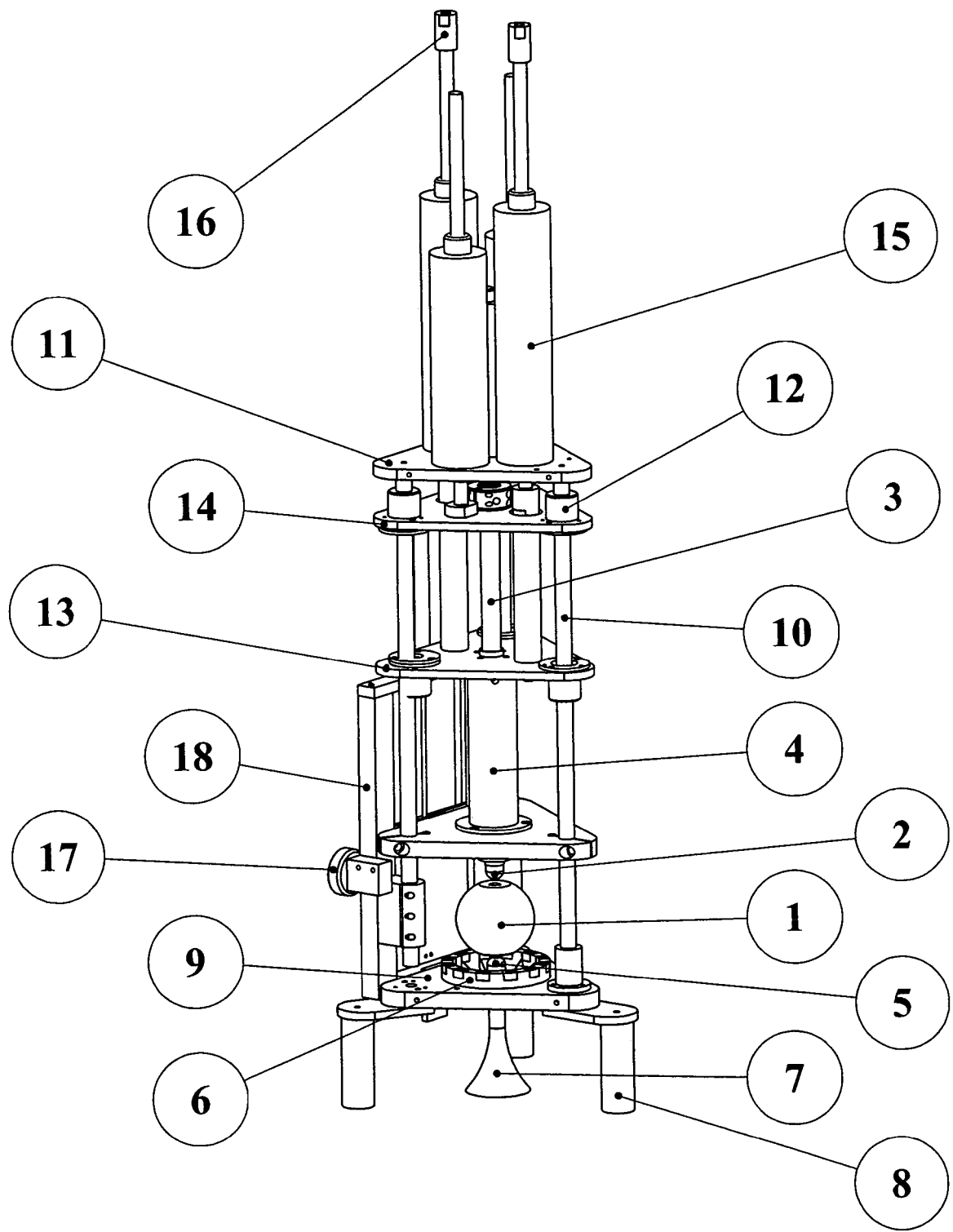
FIG. 1 depicts an overview of the preferred embodiment of the invention.

Referring now to FIG. 1, the preferred embodiment of this invention is implemented by a machine supported by three legs (8) inside a reservoir of enzyme solution (not shown). The level of solution approaches the height of the lower platform (9). Apples (1) that pass through the knife cassette (6) fall immediately into the solution. Integral to the knife cassette is a vertical lower guide pin (5) that is an extension of the blade cone support (7). The bottom of the blade cone support rests on the same plane as the bottom of the legs.

Figure 2:
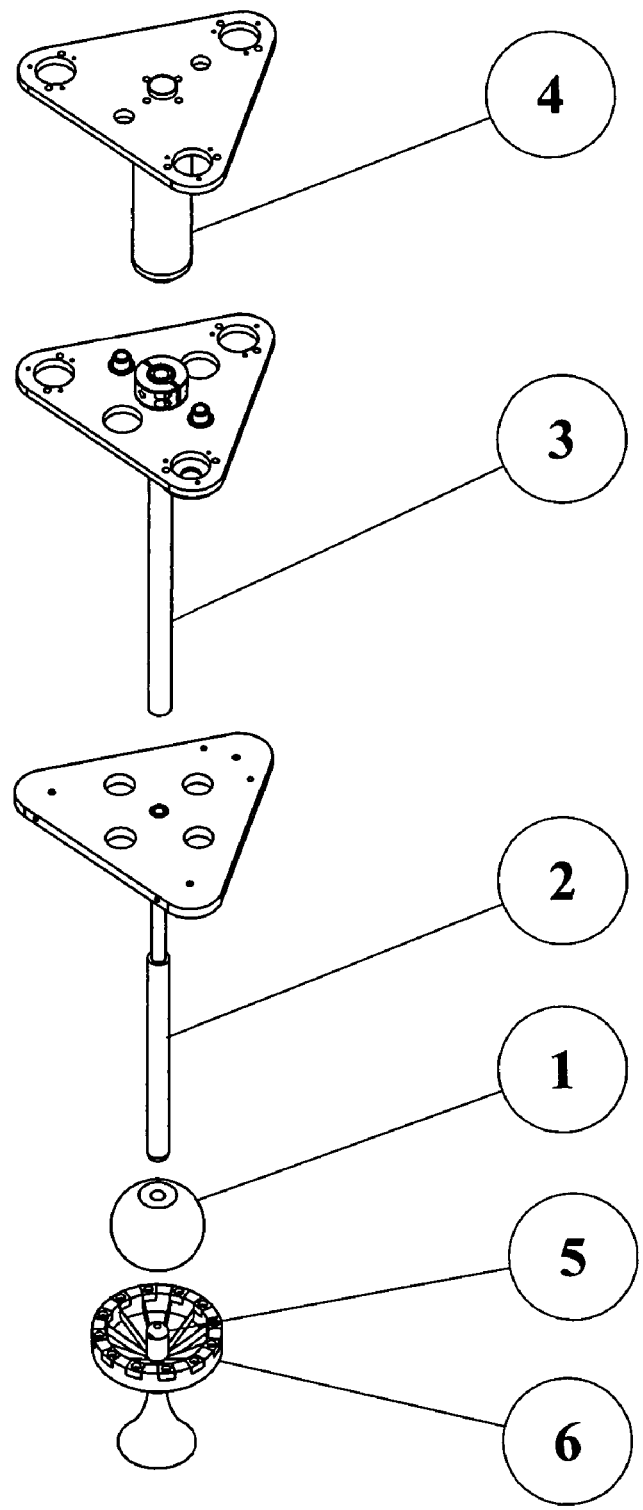
FIG. 2 depicts only a portion of the preferred embodiment, for clarity, with all the other parts from FIG. 1 not shown. Specifically, FIG. 2 only shows: apple (1), upper guide pin (2), core tube (3), rubber-faced ram (4), lower guide pin (5), and knife cassette (6).

For clarity, FIG. 2 shows only apple (1), upper guide pin (2), core tube (3), rubber-faced ram (4), lower guide pin (5), and knife cassette (6) with all the other parts from FIG. 1 not shown. Rubber-faced ram (4) need not be covered with rubber, but can be uncovered, or covered with other cushioning, flexible or elastic type material.

Figure 3:
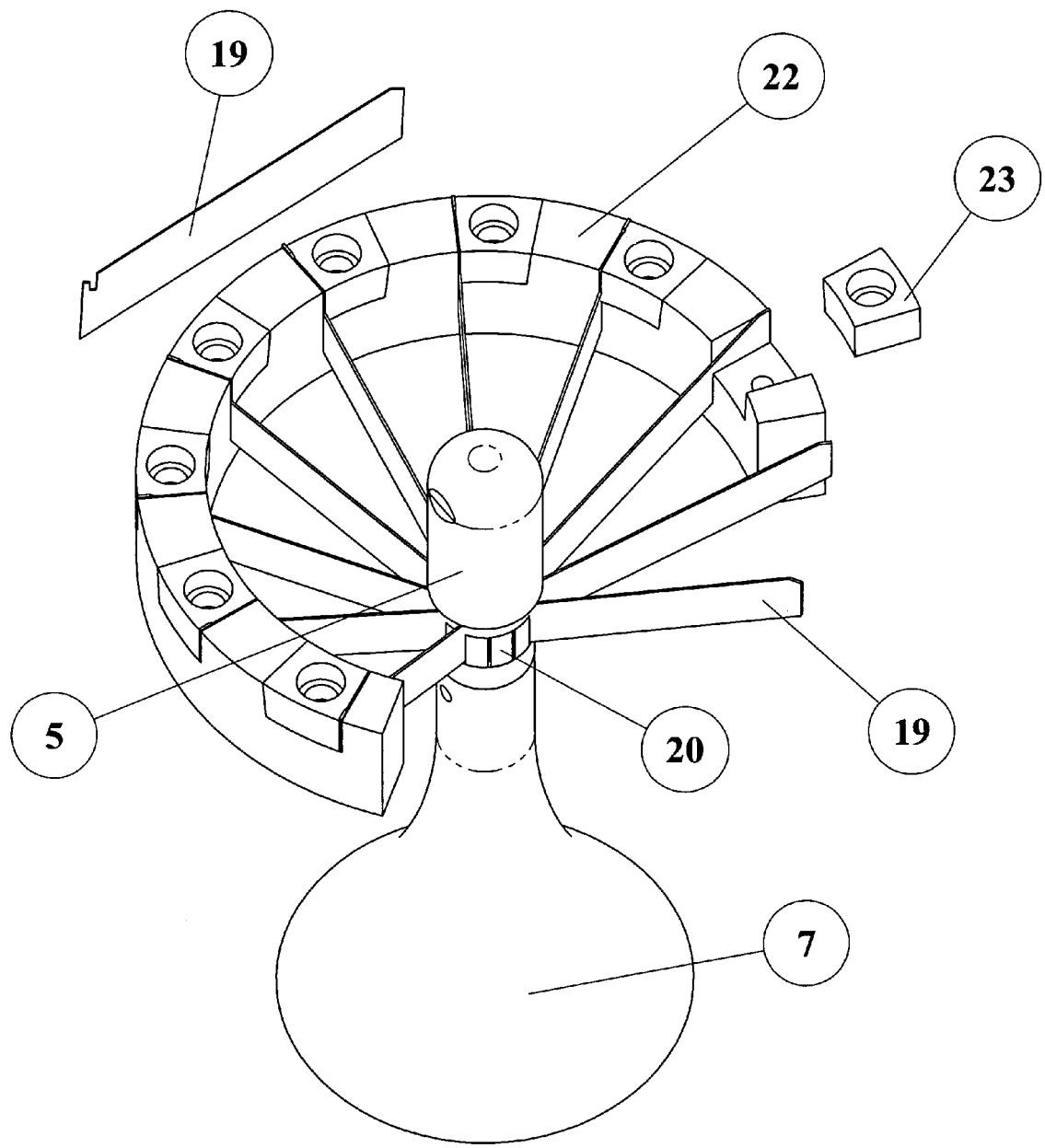
FIG. 3 depicts the Blade Cartridge Assembly.

Referring now briefly to FIG. 3, the blade cartridge assembly is comprised of the lower guide pin (5), knife cassette (6) (from FIG. 2), and blade support cone (7). The blade cartridge assembly can be removed and replaced at will by lifting it out of position. FIG. 3 also depicts blade ring (22) with blade locking wedges (23). The head of the lower guide pin (5) is the target for apple placement. An apple (1) may be placed to rest on its calyx, or it may be placed upside-down or inverted to rest on its stem hole, either being at the discretion of the operator based on the shape of the variety of apples being processed.

The knife cassette (6) (from FIG. 2, but shown in constituent parts in FIG. 3) holds a plurality of vertical blades (19). There may be as few as one or two blades cutting the apple into two sections, or as many blades desired to cut any maximum discrete number of segments. The blades radiate outwardly from the lower guide pin (5) to the outer ring of the blade cartridge assembly (see FIG. 3). Although the direction of slicing is vertical, the blades are tipped downward toward the lower guide pin (6) and its blade support cone (7). Thus, a bias in apple motion is created which naturally holds the wedges against the lower guide pin's outer surface until the blade support cone (7), spreads the wedges outwardly into solution. Wedges move straight down during slicing and then outward into solution after slicing is complete.

Referring back to FIG. 1, a safety door (18) is timed to open and close, allowing the operator to place an apple (1) on the lower guide pin (5) and wait for the upper guide pin (2) to descend into place, at which time the operator pushes the cycle start button (17) to initiate the balance of the cycle.

Continuing to refer to FIG. 1, in order to minimize the use of electricity in a wet area (a matter of safety), the operation of the machine is controlled by an air-logic system that distributes air at given pressures, intervals and directions, to a series of air cylinders (15) that are fixed to the upper platform (11). In the very center of the upper platform (11) is a single air cylinder that drives the upper guide pin (2). On opposing sides of the single air cylinder are two additional air cylinders that drive the coring platform (14). The coring tube (3) is fixed to the coring platform (14) and encapsulates the upper guide pin (2).

When the cycle start button (17) is pushed the coring tube (3) descends, pierces the apple, isolates the apple core internally and stops slightly short of contacting the lower guide pin (5). During the core tube's descent the apple (1) remains in place because it is attached to its core all the way up to the final moment when the core tube pierces through the bottom of the apple. At that point the apple separates from the core, but remains suspended on the core tube (3) by friction.

Next, twin opposed air cylinders (15) mounted on the upper platform (11) (preferably in a transverse plane to the previously mentioned air cylinders) drive the ram platform (13). The rubber-faced ram (4) is fixed to the ram platform (13) and encapsulates the core tube (3). The ram (4) pushes the apple (1) downward. The apple (1) pilots itself in a telescoping fashion, firstly sliding over the core tube (2), and secondly over the lower guide pin (5), making a seamless transition between the two. Knife blades that extend radially from the lower guide pin (5) slice the apple into a plurality of segments or wedges which fall into enzyme solution.

The frame of the machine is made up of two fixed triangular platforms, the lower platform (9) and the upper platform (11). They are spaced apart by three fixed ceramic coated guide rails (10), upon which all other platforms are free to move in the vertical direction by way of composite bearings (12). The length of stroke for each platform is adjustable by means of stop nuts (16) at the top of cylinder rods and by the use of spacers (not identified in this FIG. 1).

After the apple is sliced, the ram (4), core tube (3) and the upper guide pin (2) are retracted in sequence to their uppermost positions. As the core tube (3) retracts it exposes the solid core of the apple. At this point the core is still being held by pressure between the lower guide pin (5) and upper guide pin (2). At the moment that pressure is released, a transverse air blast ejects the solid apple core into a separate receptacle. Finally, the safety door opens, the operator places another apple and the cycle repeats.

FIG. 3—Blade Cartridge Assembly. The blade cartridge assembly is a separate serviceable unit of the coring and slicing machine. It can be quickly disassembled, serviced and reinstalled. The blade support cone (7) is the base unit that rests on the bottom tray surface of an enzyme reservoir. It is normally submersed in the enzyme solution. The blade mandrel (20) is directly above the blade support cone (7) and is fastened into it. Individual knife blades (19) are embedded into the blade mandrel (20) and clamped downward by the lower guide pin (5). The blade cartridge assembly holds a plurality of knife blades that extend radially from the blade mandrel (20) and terminate in slotted positions in the blade ring (22). The knife blades (19) are individually clamped to the blade ring (22) with blade locking wedges (23). The diameter of the blade mandrel (20) is less than the lower guide pin (5). This condition permits the knife blades (5) to be anchored and restrained below the lower guide pin (5) and inside the perimeter of the guide pin's sliding diameter such that the active cutting edges of the knife blades will completely sever the apple segments from lower guide pin (5) to blade ring (22) without any obstructions, spot welds, bends, or other interruptions to the cutting surfaces. The blade locking wedges (23) exert a side pressure against the knife blades (19) that assures their rigid vertical position during slicing. The knife blades (19) are radially positioned in a downward direction from the outer blade ring (22) to inner lower guide pin (5). This condition creates a bias in apple wedge motion, such that the wedges are held against the lower guide pin's (5) outer surface as they descend through the knife blades (19). This assures a straight path through the knife blades (19) during slicing which prevents tearing of the apple's cell structure. At the bottom of the descent the tapered apron surface of the blade support cone (7) spreads the apple wedges in an outward direction so that they will fall into the enzyme individually and be fully coated with enzyme.

Figure 4:
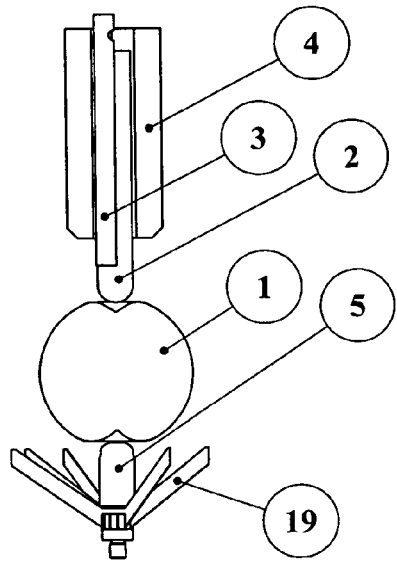
FIGS. 4-a through 4-d depicts sectional views of a portion of the preferred embodiment in operation.
Figure 4:
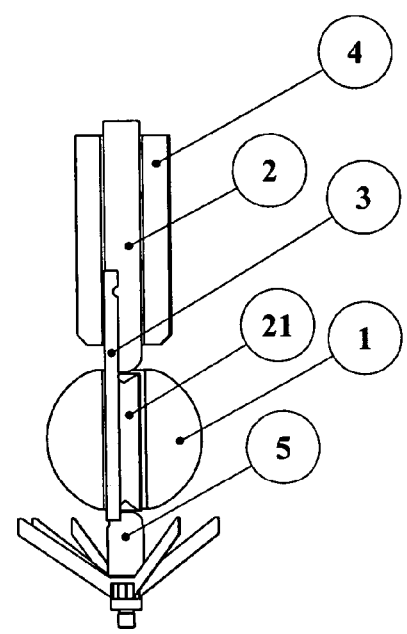
Figure 4:
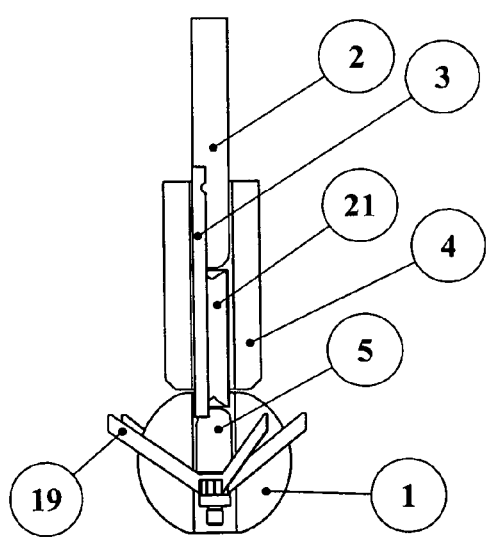
Figure 4:
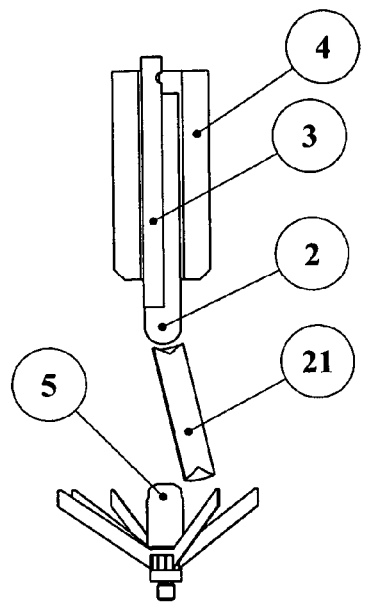

Referring now to FIG. 4, the operation of the preferred embodiment can be better understood. In FIG. 4-*a*, apples (1) are positioned by human discretion and oriented by hand so that the calyx of the apple rests on a vertical lower guide pin (5). Concurrently, as part of an automated cycle, an upper guide pin (2), coaxial with the lower guide pin (5), descends into the stem hole until a preset pressure between pins secures the apple in a stationary position, held by a compressive force through its core, as shown in FIG. 4-*a*.

As shown in FIG. 4-*b*, the operator's hand is removed and the cycle continues such that a thin-walled coring tube (3) descends downward, piloting over the upper guide pin (2) and through the apple (1) in a piercing motion until it reaches the lower guide pin (5), thus separating the core of the apple from the rest of the apple, internally, as shown in FIG. 4-*b*. Thereafter, a soft rubber faced ram (4) descends downward, piloting over the core tube (3) as it pushes the apple through a cassette of radial knife blades (6) so as to create a plurality of wedges in a single descent. The apple is guided through its descent, first over the core tube (3), and secondly over the lower guide pin (5). A tapered support pillar under the knives induces the wedges to separate from each other as they descend into a solution of enzymes that immediately seal freshness into the apple by preventing oxygen from reaching or reacting with the raw cell structure of the sliced wedges, as shown in FIG. 4*c*.

Thereafter, the ram (2), core tube (3) and upper guide pin (4) retract to their upper positions allowing the solid apple core to be ejected at a precise moment by air blast or other method, as shown in FIG. 4*d*. At this point the operator is ready to place another apple and the cycle repeats.

SUMMARY OF THE PREFERRED EMBODIMENT

In the preferred embodiment a single station is used to position the apple, to compress and hold the apple by its core, to core (pierce and isolate) the apple, to slice the apple, and to retain and eject the solid core. In other words, instead of grasping the apple and slicing and punching out the core, this embodiment captures the core, and slices off the apple in slices. The apple slices have but to fall away from the blades into the solution without being handled at all. This embodiment produces the most accurate and premium quality product and substantially reduces the cost of equipment. The outside surfaces of the edible portion of the apple (the slices themselves) are not touched by machine components, and are therefore not bruised or otherwise damaged. The cut surfaces are straight and cleanly severed with little or no tearing of the apple's cell structure. The above accuracy of slicing is facilitated by combining the core tube (3) and lower guide pin (5) into a concentric and connected condition that creates a continuous and seamless "linear guide rail". The apple (1) is piloted through the knives over this "combined linear rail", assuring a precision low stress coring and slicing of the apple.

DESCRIPTION OF SOME ALTERNATE EMBODIMENTS

It is possible to divide the process steps described in the "single station" embodiment discussed above into a "multiple station" concept without compromising the claims of the invention or merits of the process as claimed. One example would be to create a "two station" machine with a circular turret concept. Apples would be loaded into station # 1 where they would be oriented and cored, then the turret would index so that the upper half of the machine would take the cored apple (still around the core tube) to a second station. At station #2 the already cored apple would be sliced by the same ram movement discussed above. The core could be ejected at station #1 or station # 2 as preferred. This embodiment would reduce the cycle time of the machine and increase production. It would require two identical "pin, tube & ram" assemblies that would index above the apple, between station #1 and station #2. Station #1 would house a lower guide pin only. Station #2 would house a complete blade cartridge assembly with lower guide pin. All of the described conditions of alignment, concentricity, and contact would be maintained at each station, just as they are in the "single station" preferred embodiment.

Likewise, "twin-spindle" configurations could also index through multiple stations, thereby processing more than one apple at a time. In other embodiments, one or more of the features described above could be combined with the "twin-spindle" embodiment.

In alternate embodiments, some or all of the actions attributed to the human operator can be performed automatically, by machine, or robotically, and/or in response to computer programmed instructions.

In addition to "apples", other relatively soft-cored fruits such as Asian, or other pears are equally served with the preferred embodiment or other embodiments of this invention.

In addition to soft-cored fruits, pitted fruits such as apricots and peaches are equally served with the preferred embodiment or other embodiments, understanding that the core tube is preferably greater in diameter than the pit of the fruit.

In addition to soft-cored fruits and pitted fruits, fibrous cored fruits such as pineapples may be sliced in similar format by the preferred embodiment other embodiments, understanding that a generally larger scaled machine size is preferable.

The invention claimed is:

1. A device comprising:
   twin-opposed coaxial upper and lower guide pins for positioning into a calyx and a stem hole of a fruit having a core, to hold the fruit;
   a coring tube operable relative to the guide pins for separating the fruit from the core; and,
   one or more blades for slicing the fruit into slices, the blades as a group arranged in a circle and oriented normal to the circle and having a common center with the lower guide pin.

2. The device of claim 1, further including a reservoir capable of holding a liquid solution, the reservoir disposed under the one or more blades such that after slicing the fruit slices will fall into the reservoir.

3. The device of claim 2, further including an upper platform disposed above the upper guide pin.

4. The device of claim 2, wherein the lower guide pin remains stationary during operation of the device, and the upper guide pin is moveable relative to the lower guide pin.

5. The device of claim 3, the upper guide pin moveable by an attached guide pin air cylinder, the guide pin air cylinder further attached to the upper platform.

6. The device of claim 3, the coring tube further comprising a coring platform, the coring platform movable by a pair of attached coring tube air cylinders, the pair of coring tube air cylinders further attached to the upper platform.

7. The device of claim 2, including a blade cartridge assembly comprising:
   a blade-locking ring with blade-locking wedges, the blade-locking ring having an inner diameter larger than the outer diameter of the largest piece of fruit to be processed by the device; and,
   a slotted blade mandrel disposed under the lower guide pin and below the level of the blade-locking ring and having an outer diameter less than the outer diameter of the lower guide pin;
   wherein the one or more blades may be attached to the blade-locking ring using the blade-locking wedges at one end of the blades, and may be attached to the blade mandrel using the slots of the blade mandrel, such that the edges of the blades are vertically disposed and will slice the fruit when the fruit is forced on and through the one or more blades.

8. The device of claim 7, the blade-locking ring having an inner diameter larger than the outer diameter of the largest piece of fruit to be processed by the device.

9. The device of claim 7, the slotted blade mandrel having an outer diameter less than the outer diameter of the lower guide pin.

10. The device of claim 3 further comprising a ram operable relative to the guide pins and the coring tube for forcing the fruit on and through the at least two blades.

11. The device of claim 10, the ram including a ram platform, the ram platform movable by a pair of attached ram air cylinders, the pair of ram air cylinders further attached to the upper platform.

12. The device of claim 11, the ram including cushioning material attached to a fruit-contacting face of the ram.

13. The device of claim 4, the lower guide pin further including a generally conical base, the circumference of the generally conical base decreasing as the height of the base increases.

14. The device of claim 2, further including a safety door disposed between a location of a user of the device and the guide pins, the safety door configured to close during operation of the device.

15. A device comprising:
   an upper and a lower guide pin for positioning into a calyx and a stem hole of a fruit having a core to secure the fruit;
   a coring tube operable relative to the guide pins for separating the fruit from the core;
   one or more blades for slicing the fruit into slices; and,
   a ram operable relative to the guide pins for forcing the fruit on and through the one or more blades.

16. A device comprising:
   twin-opposed coaxial upper and lower guide pins for positioning into a calyx and a stem hole of a fruit having a core, to hold the fruit;
   a generally cylindrical thin-walled coring tube operable relative to the guide pins for separating the fruit from the core, the coring tube having an inner diameter large enough to allow insertion of the upper guide pin and an outer diameter approximately equal to an outer diameter of the lower guide pin;

one or more blades for slicing the fruit into slices, the blades as a group arranged in a circle and oriented normal to the circle and having a common center with the lower guide pin; and, a generally cylindrical ram operable relative to the guide pins and the coring tube for forcing the fruit on and through the at least two blades, the ram having an inner diameter large enough to allow insertion of the coring tube.

* * * * *